United States Patent [19]
Eslambolchi et al.

[11] Patent Number: 5,778,114
[45] Date of Patent: Jul. 7, 1998

[54] FIBER ANALYSIS METHOD AND APPARATUS

[76] Inventors: Hossein Eslambolchi, 24 Hartley La., Basking Ridge, N.J. 07920; John Sinclair Huffman, 150 Clearview Cir., McDonough, Ga. 30208

[21] Appl. No.: 844,185

[22] Filed: Apr. 18, 1997

[51] Int. Cl.$^6$ .................................................. G02B 6/00
[52] U.S. Cl. ........................... 385/12; 385/13; 385/11; 385/28; 250/227.14; 250/227.15
[58] Field of Search ..................... 385/12, 13, 11, 385/28, 24, 38, 123, 146; 250/227.11, 227.14, 227.17, 227.18, 227.19, 227.15

[56] References Cited

U.S. PATENT DOCUMENTS

| | | | |
|---|---|---|---|
| 4,904,050 | 2/1990 | Dunn et al. | 350/96.29 |
| 5,483,607 | 1/1996 | O'Keefe | 385/11 |
| 5,694,497 | 12/1997 | Sansone | 385/13 |

OTHER PUBLICATIONS

Eric Udd, Fiber Optic Sensors Based on the Sagnac Interferometer and Passive Ring Resonator, pp. 233–269. Fiber Optic Sensors: An Introduction for Engineers and Scientists. Edited by Eric Udd. ISBN 0–471–83007–0, 1991 John Wiley & Sons, Inc.

The Photonics Dictionary, Book 4, 41st International Edition 1995. Absolute Optical Testing: Computers, Interferometers Combine for More Acurate Optical Tests. James C. Wyant; Fringes, Waves, Optical Quality: Understanding Where Fringes Come from and Their Roles in Quality, Bruce H. Walker (Walker Associates).

A. Yu, A.S. Siddiqui, Optical Modulators Using Fibreoptic Sagnac Interferometers, Paper 9806J (E13), first received 14th Oct. 1992 and in revised form 2nd Mar. 1993. IEE Proc.–Optoelectron., vol. 141, No. 1, Feb. 1994, pp. 1–7.

Mieczyslaw Szustakowski, Leszek R. Jaroszewica, Detection of the phase disturbance in fibre optic Sagnac interferometer; SPIE vol. 2341 Interferometric Fiber Sensing (1994), pp. 74–88.

GRI–FOIDS Report, Appendix B, Submitted by Mason & Hanger National, Inc., 260 Finney Drive, Huntsville, AL 35824, Aug. 1995, Approved: NICOR Technologies Inc., pp. 1–23.

GRI–FOIDS Test Plan, Appendix 1, Submitted By: Mason & Hanger National, Inc., 260 Finney Drive, Huntsville, AL 35824, May 1995.

Field Evaluation of a Fiber Optic Intrusion Detection System—FOIDS, Prepared by: NICOR Technologies, Inc.

*Primary Examiner*—Phan T.H. Palmer
*Attorney, Agent, or Firm*—Robert B. Levy

[57] ABSTRACT

A Fiber Analysis System (10) detects threats to a buried underground fiber (10) by delivering two optical sub-signals, split from a single beam, into opposite ends of the fiber so the sub-signals traverse the fiber in opposite directions. The sub-signals are recombined into a beam whose characteristics are detected by a detector (24). The output signal of the detector (24) is compared by a processor (26) to different reference values stored in a data base (28) representing different detector output signals corresponding to different fiber conditions. By matching the detector output signal to a reference value associated with a particular fiber condition, the processor can determine whether a potential threat exists. By inducing a sequence of known vibrations (tones) inn the fiber at spaced locations along a generally orthogonal to the fiber (12), the processor (26) can establish the location of the fiber by comparing the detector output signal to a reference signals corresponding to the known tones to determine which one was received in the shortest time.

21 Claims, 2 Drawing Sheets

FIBER ANALYSIS METHOD AND APPARATUS

TECHNICAL FIELD

This invention relates to a technique for analyzing a buried underground optical fiber to ascertain its location, as well as to detect potential threats thereto.

BACKGROUND ART

Most telecommunications carriers employ optical fibers in place of copper wires to carry telecommunications traffic. As compared to copper wires, optical fibers offer several advantages. Optical fibers possess much greater bandwidth in contrast to copper wires. Thus, a single optical fiber can carry many more voice conversations than a copper wire pair. Additionally, optical fibers are immune to electrical interference. Cross talk between two adjacent optical fibers within an optical fiber cable is non-existent, whereas crosstalk between adjacent copper wires with the same cable can and does occur, resulting in signal deterioration.

For cosmetic reasons, as well as to provide protection against the elements, telecommunications carriers typically bury underground the optical fiber cables employed to carry long haul traffic. Unfortunately, burial does not render the optical fiber cables completely invulnerable to damage. Occasionally, a contractor excavating along an optical fiber cable right-of-way will inadvertently sever the cable. Since most fiber optic cables carry large volumes of telecommunications traffic, a severed optical fiber cable creates a major service disruption. For that reason, telecommunications carriers take great care to monitor their fiber optic cables to detect potential harm in an effort to avoid cable damage.

Various techniques exist for monitoring buried fiber optic cables. Once such technique is disclosed in U.S. Pat. No. 4,904,050, issued on Feb. 27, 1990, in the names of Lawrence Dunn et al. (herein incorporated by reference). The Dunn et al. '050 patent discloses the desirability of detecting intrusion into an optical fiber by an interferometric arrangement, whereby a pair of optical signal sub-signals, derived by splitting a single optical signal, are injected into opposite ends of the fiber via a coupler. In this way, each optical sub-signal injected into a fiber end emanates from the opposite fiber end. The optical sub-signals emanating from the fiber ends are recombined at the splitter for input to a detector that measures the phase difference between the signals as a detectable pattern. If an intrusion has occurred, the pattern detected by the detector will differ from the pattern detected under quiescent conditions (no intrusion).

The Dunn et al. '050 patent, while providing a technique for detecting intrusion into an optical fiber, provides no mechanism for determining the nature of that intrusion. Thus, the Dun et al. '050 patent can not distinguish between different kinds of threats to an optical fiber cable, whether environmental, or man-made.

Thus, there is a need for a technique for analyzing a buried underground fiber to ascertain certain information, including potential threats, to the fiber.

BRIEF SUMMARY OF THE INVENTION

Briefly, a technique is provided for analyzing a buried underground fiber by first splitting an optical signal into a pair of sub-signals for injection into opposite ends of a fiber. In this way, the sub-signals traverse the fiber in opposite directions and emanate from the fiber ends opposite the respective ends into which the sub-signals were injected. The sub-signals are re-combined and the and the re-combined signal is input to a detector that detects the characteristics of the recombined signal. In accordance with the invention, the fiber receives may stresses that cause a variation in one or more characteristics of the optical sub-signals traversing the fiber in opposite directions. Such stress may arise as a result of man-made vibrations in the vicinity of the fiber. For example, a piece of construction equipment excavating in the vicinity of the fiber produces vibrations that stress the fiber. The stress may also be attributable to changes in temperature as a result of exposure of the fiber to ambient conditions following erosion of the earth burying the fiber. Indeed, the stresses may be intentionally applied in the form of a sequence of tones (vibrations) for the purpose to establishing the physical location of the fiber. The output signal of the detector under the condition when the fiber receives stresses is compared to each of a set of reference values associated with identifiable fiber conditions. Thus, for example, a detector output signal resulting from a vibration applied to the fiber is compared to different reference values associated with different types of vibrations. Based on a match between the detector output signal and the reference value associated with a known source of vibration, the type of vibration experienced by the fiber can be identified. By subjecting the fiber to a sequence of vibrations (tones) from a set of spaced-apart oscillators, the location of the fiber can be ascertained based on a comparison between the detector output signal and the reference value associated with each of the sequence of vibrations. In this way, the closest oscillator signal can be determined from which the fiber location can be established.

Additionally, the analysis technique of the invention can be employed to determine the temperature of the fiber. When the fiber temperature changes, the frequency of the light backscattered within the fiber changes. Thus, by comparing the detector output signal to reference values representing light backscattering frequencies for different temperatures, the temperature of the fiber can be ascertained. From a knowledge of the fiber temperature, a determination can be made whether there has been a possible erosion of the earth burying the fiber.

DETAILED DESCRIPTION

Figure 1:
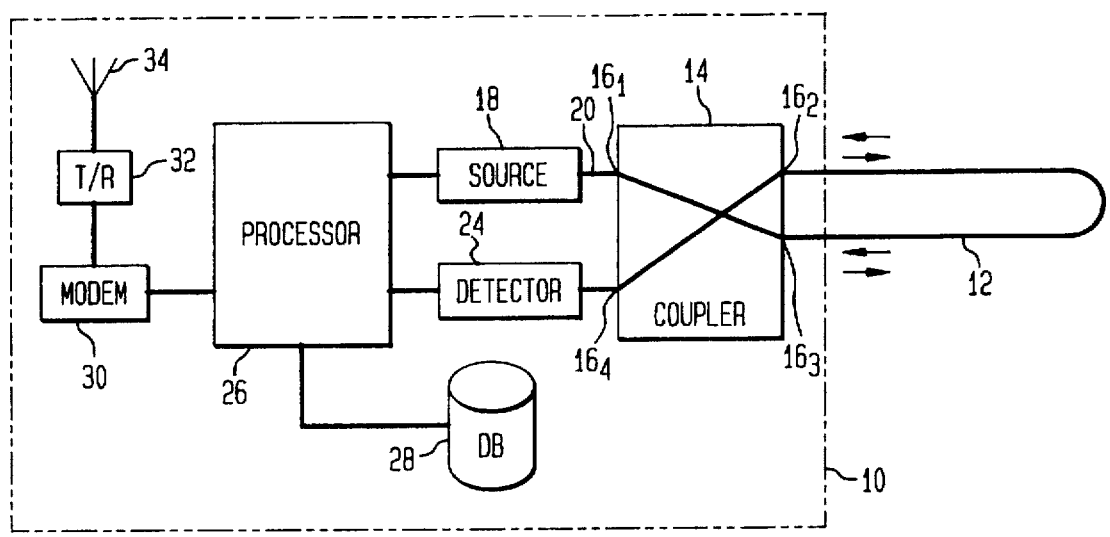
FIG. 1 shows an apparatus, in accordance with the invention, for analyzing a buried underground optical fiber.

FIG. 1 depicts a Fiber Analysis System (FAS) 10, in accordance with the invention, for monitoring a length of optical fiber 12 buried underground. While the fiber 12 is shown as a single integral member, the optical fiber could comprise a plurality of fiber pieces joined by one or more connectors (not shown). The FAS 10 includes a splitter 14 having four ports $16_1$–$16_4$. Such four-port splitters are manufactured by Gould, Inc., among others. A source of light 18 having a high degree of coherence, such as a laser, produces a relatively narrow beam of light 20 for receipt at the splitter port $16_1$. Upon receipt of the beam 20 at its port $16_1$, the splitter 14 splits the beam, yielding two optical sub-signals at the splitter ports $16_2$ and $16_3$. The sub-signals are injected into to opposite ends of the fiber 12 and traverse the fiber in opposite directions. Each optical sub-signal exits the fiber 12 from the end opposite the end into which the sub-signal was injected.

The optical sub-signals exiting the fiber 12 re-enter the splitter ports $16_2$ and $16_3$, respectively, for re-combination by the splitter 14 into a beam 22 that exits the splitter port $16_4$ for receipt at a detector 24. The characteristics of the beam detected by the detector 24 depend on the interference between the two optical sub-signals recombined at the splitter 14. If the two optical sub-signals destructively interfere, then power produced by the detector 24 will be less, whereas if the optical sub-signals constructively interfere, the power produced by the detector is greater.

Under quiescent conditions, that is, no stresses on the fiber 12, the phase difference between the optical sub-signals traveling in opposite directions in the fiber should be equal, thus canceling each other. However, when the fiber is stressed, because of vibration, the phase differences typically do not cancel each other. Thus, the output signal of the detector 24 will change in response to stress on the fiber. The magnitude of the phase difference may be controlled by varying the split provided by the splitter 14. A 50—50 split provides the greatest sensitivity. However, other percentages may be desired where noise is a factor.

As will be discussed in greater detail below, stress on the optical fiber can be characterized, in accordance with the invention, to determine the nature of vibrations on the fiber. Moreover, the characteristics of the re-combined beam produced by recombining the optical sub-signals can be utilized to locate the fiber by applying a sequence of known oscillations (vibrations). Additionally, as will be described hereinafter, the characteristics of the re-combined beam, and in particular, the frequency of the light backscattering in the beam, can be utilized to determine the fiber temperature, thus providing a mechanism for determining erosion of the earth under which the fiber is buried.

To characterize the stress on the fiber 12 in accordance with the invention, at least the detector 24, and preferably the light source 18, are controlled by a processor 26 in the form of a computer or the like. The light source 18 may be controlled by the processor 18 to generate a continuous beam, a random pattern of light, or a pulsed beam representative of a string of binary values representing a digital word.

The processor 26 is responsive to the output signal of the detector 24 and serves to compare the re-combined beam characteristics detected by the detector to plurality of reference values stored in a data base 28, typically comprised of a magnetic storage medium, such as a disk drive. For purposes of illustration, the data base 28 has been depicted in FIG. 1 as an element distinct from the processor 26. In reality, the data base 28 may reside on a disk drive within the processor itself. Alternatively, the data base 28 could reside on a file server (not shown) connected to the processor.

The reference values stored in the data base 28 are associated with detector output signals corresponding to known fiber conditions. For example, the data base 28 contains reference values associated with the detector output signals for different types of vibrations, such as those caused by excavating machines, motorized vehicles, animals, humans, as well as other vibration sources. Upon receipt of the signal from the detector 24, the processor 26 accesses the data base 28 to compare the detector signal to each of the stored reference values to establish a match therebetween. Once a match is established, the processor 26 can determine the nature of the vibration. If, for example, the vibration is attributable to a particular type of excavating equipment, the processor 26 can determine the type of excavating equipment from a match of detector output signal to the corresponding reference value stored in the data base 28 associated with that type of excavating equipment.

As will be discussed below, the data base 28 may also contain reference values that are associated with fiber stresses other than vibration. For example, changes in temperature will stress the fiber 12, causing changes in the frequency of the light backscattered in the fiber. By matching the reference value associated with backscattered light frequency corresponding to a particular temperature to the output signal of the detector 24, the processor 26 can readily determine the approximate fiber temperature. Changes in the temperature may occur as a result of exposure of the buried fiber 12 to ambient conditions, indicating possible erosion of the earth burying the fiber.

The processor 26 of FIG. I is coupled by a modem 30 to a Radio Frequency Transceiver (T/R) 32 that transmits information to, and receives information from a central office (not shown). In practice, the T/R 32 transmits and receives information through an antenna 34 to and from a satellite (not shown) respectively, which, in turn, relays the information to and from the central office. Rather than transmit at satellite frequencies, other radio frequencies could be used. For example, the T/R 32 could relay information over cellular telephone frequencies. Alternatively, the processor 26 could transmit information to, and receive information from, the central office via a telephone line (not shown) connected to the modem 28.

The FAS 10 of FIG. I can readily be employed as an Optical Time Domain Refelectometer (OTDR). By controlling the light source 18 to produce a particular pattern, and by comparing the beam characteristics sensed by the detector 24 to known beam characteristics, the FAS 10 can perform the same analysis as an OTDR without the need for subjective analysis by a technician, as required with a conventional OTDR. While different light patterns are effective, a random pattern is likely to produce the greatest gain.

Figure 2:
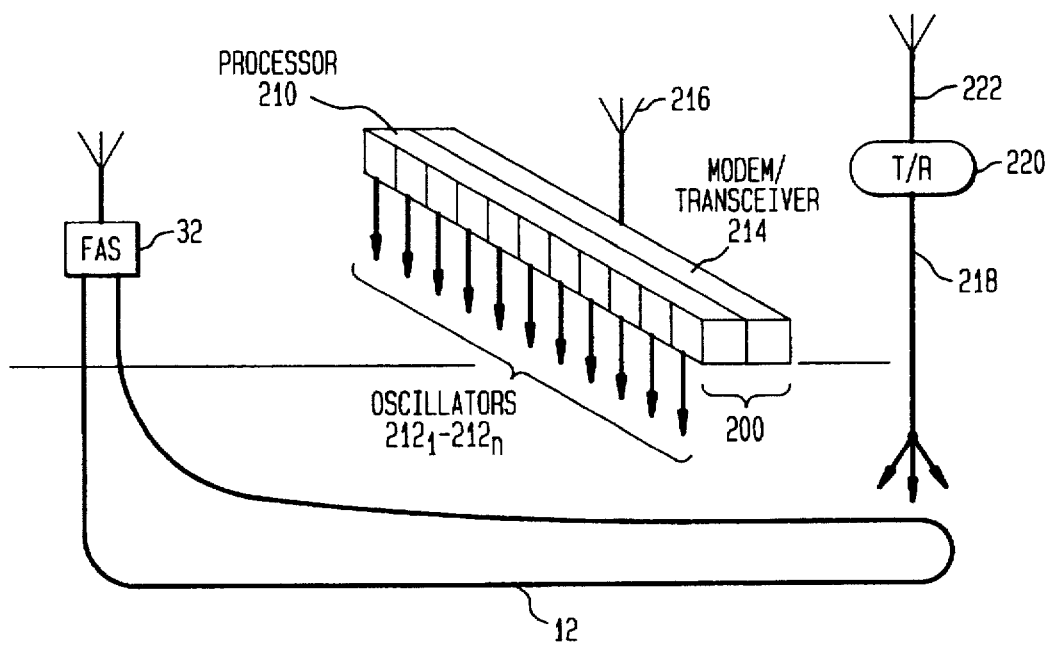
FIG. 2 shows a system for determining the location of a buried optical fiber that incorporates the fiber analyzing apparatus of FIG. 1.

Referring to FIG. 2, the FAS 10 of FIG. 1 can be employed to locate the buried underground fiber 12 very accurately using interferometric principles in accordance with the invention. As discussed above with regard to FIG. 1, the FAS 10 analyzes the fiber by comparing the actual fiber condition, as determined from the output signal of the detector 24 of FIG. 1, to each of a set of reference values corresponding to known fiber conditions. When known stresses (vibrations) are induced in sequence on the fiber 12 at spaced locations therealong, the FAS 10 can locate the fiber by determining the vibration closest to the fiber.

To locate the fiber in this manner, a technician (not shown) first places a vector bar 200 on the earth above the fiber 12 generally at a right angle to the fiber. The vector bar 200 comprises a processor 202, in the form of a computer or the like, that controls a plurality of uniformly-spaced apart oscillators $212_1$–$212_n$, where n is an integer. In practice, n=10, although a larger or smaller number of oscillators is possible. Increasing the number of oscillators increases the accuracy of location, while reducing the number of oscillators decreases the location accuracy.

During the fiber location process, the processor 202 actuates each of the oscillators $212_1$–$212_n$ in sequence, so each oscillator generates, at a different position along the vector bar, a distinct frequency in the 1 kilohertz range. Each oscillator produces a vibration that stresses the fiber 12, causing a deviation in the detector signal in the FAS 10. By matching the reference value associated with the particular oscillator signal to the actual detector signal, the FAS 10 determines which oscillator is active. Once all of the oscillators $212_1$–$212_n$ are actuated, the FAS 10 determines which oscillator signal was received in the shortest period of time. The oscillator signal received in the shortest period of time will be produced by the oscillator closest to the fiber 12. By identifying which of the oscillators $212_1$–$212_n$ is closest to the fiber, the FAS 10 facilitates location of the fiber 10.

In the illustrated embodiment, the vector bar 200 includes the combination of a modem and transceiver 214 for receiving radio frequency information via an antenna 216 for receipt by the processor 210 and for transmitting information from the processor. The modem/transceiver 214 is tuned to the same frequency as the FAS 10 to permit the FAS to send commands to, and receive information from the vector bar 200. In this way, the FAS 10 can command the processor 210 within the vector bar 200 to actuate a particular one of the oscillators $212_1$–$212_n$ in sequence. In response, the vector bar 200 acknowledges the command by transmitting an appropriate acknowledgment signal. By knowing which oscillator is active, the FAS 10 can analyze each signal to determine which signal was received in the shortest time, thus determining which oscillator is closest to the fiber 12. The FAS 10 transmits information to the vector bar 200 identifying the oscillator to facilitate location of the fiber 12 by the technician.

If desired, a probe device 218 having a single oscillator (not shown) may be inserted into the earth for generating a short, low level tone that is receivable only within a short distance (i.e., a few inches) from the fiber 12. The presence of the oscillator signal from the probe 218 will be detected by the FAS 10 which, in response, will confirm the exact location of the fiber 12. As the vector bar 200, the probe 218 may include a Transceiver (T/R) 220 coupled to an antenna 222 for transmitting information to, and receiving information from, the FAS 10 to allow the FAS to address the probe for control purposes.

Figure 3:
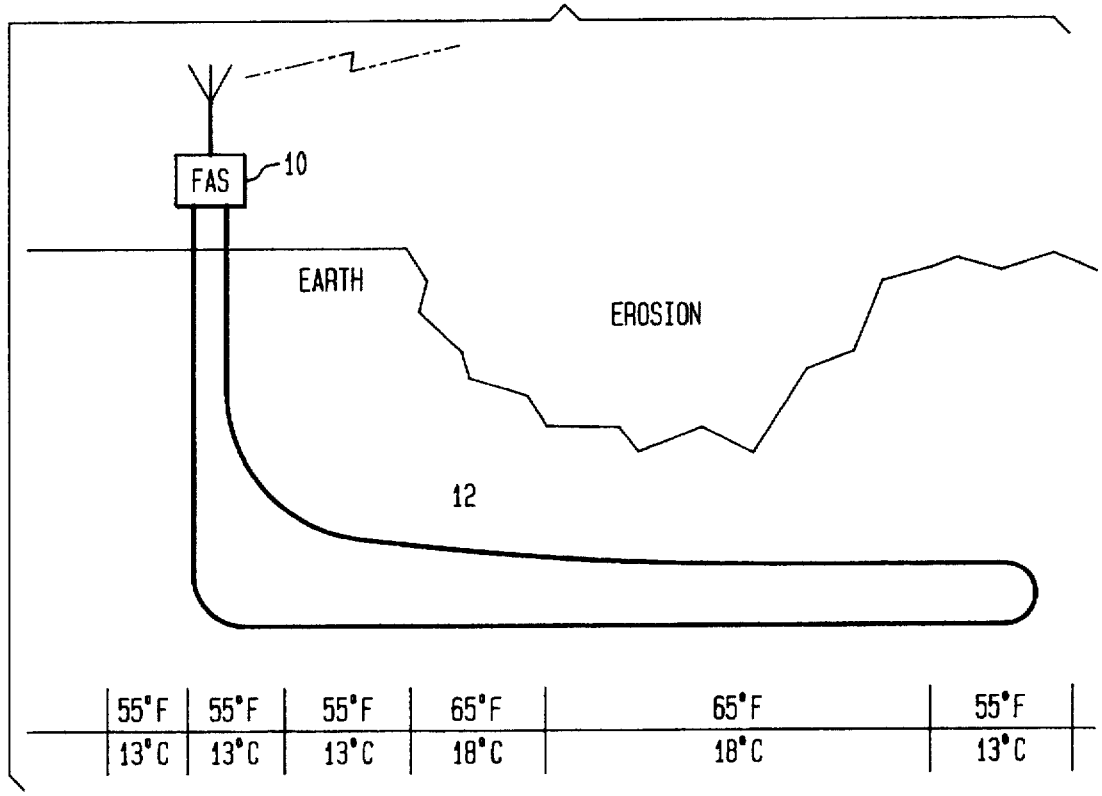
FIG. 3 shows the use of the apparatus of FIG. 1 for measurement of the fiber temperature in accordance with the invention to detect erosion of the earth under which the fiber is buried.

FIG. 3 illustrates the use of the FAS 10 of FIG. I for sensing the temperature of the fiber 12 to detect possible erosion of the earth burying the fiber. It is known that changes in the temperature of the fiber 12 cause changes in the frequency of light backscattered in the fiber. By comparing the detector signal detected by the detector 24 of FIG. 1 to reference values corresponding to backscattered light frequencies associated with different fiber temperatures, the temperature of the fiber can be measured. Indeed, the FAS 10 can measure the temperature of the fiber at approximately 30 foot (~10 meter) increments.

In practice, while the fiber 12 lies buried below the earth, the fiber temperature remains relatively constant along the length of the fiber. The actual fiber temperature depends on climatic conditions. Thus, a fiber 12 buried in a colder climate has a lower temperature than a fiber buried in a warmer climate. Moreover, during winter months, the temperature of the earth, and hence temperature of the fiber, is lower than during the summer months. Generally, climatic and seasonal changes in temperature can be taken into account so that deviations in the fiber temperature based on climate and season, by themselves generally will not trigger the FAS 10.

However, dramatic changes to the temperature of the fiber 12 can occur if the earth burying the fiber erodes, as may occur due to mud slides, flooding, severe rain, etc. As depicted in FIG. 3, the temperature of the fiber 12 may be 55° F. (13° C.) while the fiber remains buried in the earth. Should a portion of the earth burying the fiber 12 erode, exposing the fiber to ambient conditions, the fiber temperature may rise to 65° F. (~18° C.). By sensing the changes in the frequency of the backscattered light in the fiber 12, the FAS 10 of FIG. 3 can detect changes in the fiber temperature and signal the central office of the possibility of erosion.

In some instances, detecting potential harm to the fiber 12 by the FAS 10 and then relaying such the information to a central office may not allow the timely dispatch of personnel to the location of the fiber to prevent potential harm thereto. For example, the FAS 10 may detect excavation along the right-of-way of the fiber 12 and then alert the central office of the potential harm. However, by the time personnel arrive on site, the contractor may have already damaged the fiber. To prevent this type of harm, at least one disturbance monitor 300 shown in FIG. 4 may be dispersed along the right-of-way of the fiber 12 for providing a visual and/or audible warning in response to a signal from the FAS 10 of potential threat to the buried fiber 12.

Figure 4:
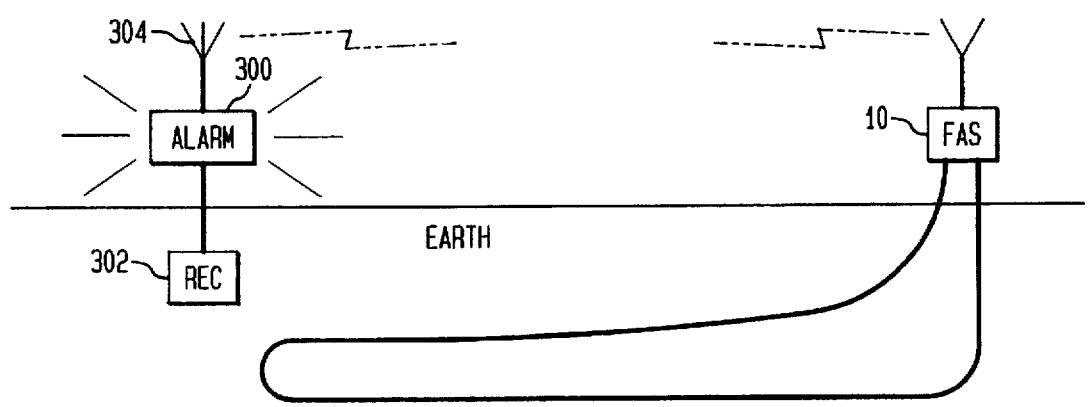
FIG. 4 shows a disturbance monitor, in accordance with the invention, for providing an alert along the right-of-way of an optical fiber cable when the cable is undergoing a disturbance, as sensed by the apparatus of FIG. 1.

Referring in FIG. 4, the disturbance monitor includes a Receiver (REC) 302 coupled to an antenna 304 for receiving signals from the FAS 10 indicative of a potential threat to the buried fiber 12. In response to such signals, the REC 302 actuates an alarm 306 that generates a warning to any one, such as an excavating contractor in the vicinity of the disturbance monitor 300, alerting such individuals of the presence of the buried underground fiber 12. The alarm 306 may include a visual alerting device, such as a flashing light or a strobe light) and/or an audible alerting device such as a siren or horn. Additionally, the audible alerting device could also include a device for playing a spoken warning.

In practice, the major components of the disturbance monitor 300, such as the REC 302, are buried below ground to protect against theft. Obviously, the alarm 306 must remain above ground in order to provide a warning to those who may potentially damage the fiber 12.

The foregoing discloses a Fiber Analysis System (FAS) 10 for analyzing a buried underground optical fiber 12 to ascertain the fiber location and potential threats thereto.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for analyzing a buried underground optical fiber comprising the steps of:

splitting an optical signal into a pair of sub-signals;

injecting each sub-signal into an end of the fiber so that the sub-signals traverse the fiber in opposite directions to emanate from ends into which the each sub-signal were injected;

combining the sub-signals emanating from the fiber ends into a single recombined beam; and measuring the characteristics of the recombined beam,

WHEREIN THE IMPROVEMENT COMPRISES:

receiving stress on the fiber that varies characteristics of the re-combined beam;

comparing the measured characteristics of the re-combined beam to reference values representing identifiable fiber conditions; and establishing a fiber condition in accordance with a match between one of said identifiable fiber conditions and the measured recombined beam characteristics.

2. The method according to claim 1 further including the step of generating warning when the fiber condition corresponds to a threat to the fiber.

3. The method according to claim 2 wherein the warning comprises an audible warning.

4. The method according to claim 2 wherein the warning comprises a visual warning.

5. The method according to claim 1 wherein the stress received on the fiber is vibration.

6. The method according to claim 5 wherein the measured characteristics are compared to reference values corresponding to different sources of vibration.

7. The method according to claim 1 wherein the stress is a temperature difference arising from exposure of the fiber to ambient conditions.

8. The method according to claim 7 wherein the measured characteristics are compared to reference values corresponding to frequencies of backscattered light in the fiber representing different fiber temperatures.

9. The method according to claim 1 wherein the stress comprises a sequence of vibrations directed towards the fiber for the purpose of fiber location and wherein the comparison step comprises the step of comparing the measured characteristics of the recombined beam to reference values, each associated a separate one of the sequence of vibrations, to determine which vibration is received in the shortest time fiber to establish the location of the fiber.

10. The method according to claim 9 wherein the sequence of vibrations comprises a sequence of tones each at different frequencies within a range of one kilohertz.

11. The method according to claim 1 further including the step of transmitting information about the fiber condition to a central office.

12. A system for analyzing a buried underground optical fiber, comprising:

a light source for generating a beam of light;

a four-port splitter for splitting the beam of light into two optical sub-signals injected into opposite ends of the fiber to traverse the fiber in opposite directions for receipt at the splitter which recombines the sub-signals into a combined beam; and a detector for detecting characteristics of the combined beam,

WHEREIN THE IMPROVEMENT COMPRISES:

a data base containing reference values representing beam characteristics corresponding to different fiber conditions; and a processor for comparing the reference values in the data base to the detected beam characteristics to find a match therebetween to establish a fiber condition in accordance with said match.

13. The system according to claim 12 further including means for communicating information between the processor and a central office.

14. The system according to claim 13 further including alarm means responsive to signals from said communication means for generating a warning when the first processor establishes that the fiber condition represent a potential threat.

15. The system according to claim 14 wherein the alarm means comprises:

an antenna;

a receiver coupled to said antenna for receiving signals from the communication means; and warning means for generating a warning.

16. The system according to claim 15 wherein the warning means generates an audible warning.

17. The system according to claim 15 wherein the warning means generates a visual warning.

18. The system according to claim 12 wherein the apparatus comprises:

a first plurality of oscillators arranged in spaced apart relationship above the fiber generally at a right angle thereto, each oscillator generating a unique tone within a one kilohertz range;

a second processor for controlling the oscillators; and means for communicating information from the first processor to the second processor to enable said first processor to determine which of the oscillator tones was received in the shortest period of time to establish which oscillator is closest to the fiber to determine the fiber location.

19. The system according to claim 18 including a probe insertable into the earth, the probe having an oscillator for generating a short, low level tone that is receivable only within a short distance from the fiber for enabling the first processor to confirm the precise location of the fiber.

20. The apparatus according to claim 12 wherein the means comprises:

an antenna a transceiver for transmitting and receiving information at a radio frequency via the antenna; and a modem for coupling the processor to the transceiver.

21. The system according to claim 12 further including apparatus for inducing a sequence of vibrations in the fiber at spaced intervals to facilitate fiber location.

* * * * *